US012614293B2

(12) United States Patent
Mendez Mendez et al.

(10) Patent No.: US 12,614,293 B2
(45) Date of Patent: Apr. 28, 2026

(54) MONOCULAR WORLD MESHING

(71) Applicant: Snap Inc., Santa Monica, CA (US)

(72) Inventors: Erick Mendez Mendez, Vienna (AT); Isac Andreas Müller Sandvik, London (GB); Qi Pan, London (GB); Edward James Rosten, London (GB); Andrew Tristan Spek, London (GB); Daniel Wagner, Vienna (AT); Jakob Zillner, Absdorf (AT)

(73) Assignee: Snap Inc., Santa Monica, CA (US)

( * ) Notice: Subject to any disclaimer, the term of this patent is extended or adjusted under 35 U.S.C. 154(b) by 462 days.

(21) Appl. No.: 18/061,775

(22) Filed: Dec. 5, 2022

(65) Prior Publication Data

US 2023/0177708 A1 Jun. 8, 2023

Related U.S. Application Data

(60) Provisional application No. 63/286,422, filed on Dec. 6, 2021.

(51) Int. Cl.
| | |
|---|---|
| *G06T 7/50* | (2017.01) |
| *G06T 7/70* | (2017.01) |
| *G06T 17/20* | (2006.01) |

(52) U.S. Cl.
CPC .................. *G06T 7/50* (2017.01); *G06T 7/70* (2017.01); *G06T 17/20* (2013.01)

(58) Field of Classification Search
CPC .............. G06T 7/50; G06T 7/70; G06T 17/20
See application file for complete search history.

(56) References Cited

U.S. PATENT DOCUMENTS

| | | | |
|---|---|---|---|
| 2010/0208057 A1* | 8/2010 | Meier ..................... | G06T 15/00 |
| | | | 345/173 |
| 2017/0091996 A1* | 3/2017 | Wei .......................... | G06T 17/20 |
| 2017/0206712 A1* | 7/2017 | Petrovskaya ......... | G06F 3/0346 |
| 2018/0025505 A1* | 1/2018 | Huang .................... | G06T 7/593 |
| | | | 382/154 |
| 2018/0108172 A1* | 4/2018 | Huston ................... | G06T 17/20 |
| 2018/0130255 A1* | 5/2018 | Hazeghi ............... | H04N 13/271 |
| 2021/0118184 A1 | 4/2021 | Pillai et al. | |
| 2021/0279957 A1* | 9/2021 | Eder ................... | G06F 18/2413 |

(Continued)

FOREIGN PATENT DOCUMENTS

| | | |
|---|---|---|
| CN | 118355406 A | 7/2024 |
| WO | WO-2023107884 A1 | 6/2023 |

OTHER PUBLICATIONS

"International Application Serial No. PCT US2022 080910, International Search Report mailed Apr. 4, 2023", 4 pgs.

(Continued)

*Primary Examiner* — Pinalben Patel
(74) *Attorney, Agent, or Firm* — Schwegman Lundberg & Woessner, P.A.

(57) ABSTRACT

A depth estimation system to perform operations that include: receiving image data generated by a client device, the image data comprising a depiction of an environment; identifying a set of image features based on the image data; determining a pose of the client device based on the set of features; generating a depth estimation based on the image data and the pose of the client device; and generating a mesh model of the environment based on the depth estimation.

20 Claims, 8 Drawing Sheets

(56)            References Cited

U.S. PATENT DOCUMENTS

2021/0295606 A1 *   9/2021   Kim ........................ G06T 17/20
2022/0385721 A1 *  12/2022   Kamaraju ............... H04L 67/06

OTHER PUBLICATIONS

"International Application Serial No. PCT US2022 080910, Written Opinion mailed Apr. 4, 2023", 5 pgs.
Yang, Xingbin, "Mobile3DRecon: Real-time Monocular 3D Reconstruction on a Mobile Phone", IEEE Transactions on Visualization and Computer Graphics, IEEE, USA, vol. 26, No. 12, (Sep. 21, 2020), 3446-3456.
"International Application Serial No. PCT/US2022/080910, International Preliminary Report on Patentability mailed Jun. 20, 2024", 7 pgs.

* cited by examiner

300

```
┌─────────────────────────────────────────────────────────────┐
│   RECEIVING IMAGE DATA GENERATED BY A CLIENT DEVICE, THE      │
│   IMAGE DATA COMPRISING A DEPICTION OF AN ENVIRONMENT         │
│                          302                                  │
└─────────────────────────────────────────────────────────────┘
                            │
                            ▼
┌─────────────────────────────────────────────────────────────┐
│   IDENTIFYING A SET OF IMAGE FEATURES BASED ON THE IMAGE DATA │
│                          304                                  │
└─────────────────────────────────────────────────────────────┘
                            │
                            ▼
┌─────────────────────────────────────────────────────────────┐
│  DETERMINING A POSE OF THE CLIENT DEVICE BASED ON THE SET OF  │
│                        FEATURES                               │
│                          306                                  │
└─────────────────────────────────────────────────────────────┘
                            │
                            ▼
┌─────────────────────────────────────────────────────────────┐
│  GENERATING A DEPTH ESTIMATION BASED ON THE IMAGE DATA AND    │
│         THE POSE OF THE CLIENT DEVICE                         │
│                          308                                  │
└─────────────────────────────────────────────────────────────┘
                            │
                            ▼
┌─────────────────────────────────────────────────────────────┐
│  GENERATING A MESH MODEL OF THE ENVIRONMENT BASED ON THE      │
│              DEPTH ESTIMATION                                 │
│                          310                                  │
└─────────────────────────────────────────────────────────────┘
```

FIG. 3

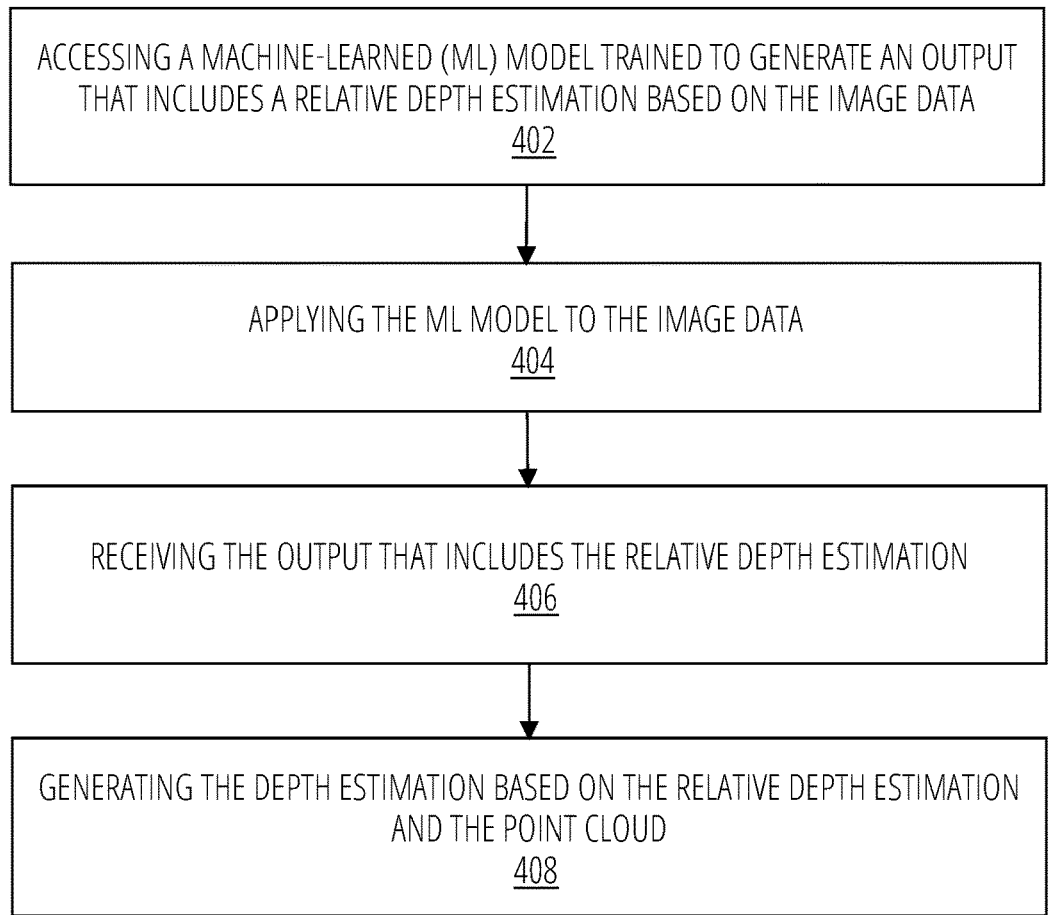
ACCESSING A MACHINE-LEARNED (ML) MODEL TRAINED TO GENERATE AN OUTPUT THAT INCLUDES A RELATIVE DEPTH ESTIMATION BASED ON THE IMAGE DATA
402
APPLYING THE ML MODEL TO THE IMAGE DATA
404
RECEIVING THE OUTPUT THAT INCLUDES THE RELATIVE DEPTH ESTIMATION
406
GENERATING THE DEPTH ESTIMATION BASED ON THE RELATIVE DEPTH ESTIMATION AND THE POINT CLOUD
408
FIG. 4

500

502

504

506

MONOCULAR WORLD MESHING

CROSS-REFERENCE TO RELATED APPLICATION

This patent application claims the benefit of U.S. Provisional Patent Application No. 63/286,422, filed Dec. 6, 2021, entitled "MONOCULAR WORLD MESHING", which is incorporated by reference herein in its entirety.

BACKGROUND

Image processing technology has been widely used for a variety of technical purposes. For example, some devices may be configured to generate three-dimensional (3D) images, and measure the depth of a target object by performing related processing on an image acquired through use of a stereoscopic camera. The so-called depth of the target object refers to the vertical distance of the target object to the plane of the lens of the image acquisition device.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 3 is a flowchart illustrating operations of a depth estimation system in performing a method for providing a depth estimate and generating a 3D image, in accordance with one embodiment.

FIG. 4 is a flowchart illustrating operations of a depth estimation system in performing a method for providing a depth estimate, in accordance with one embodiment.

DETAILED DESCRIPTION

Figure 1:
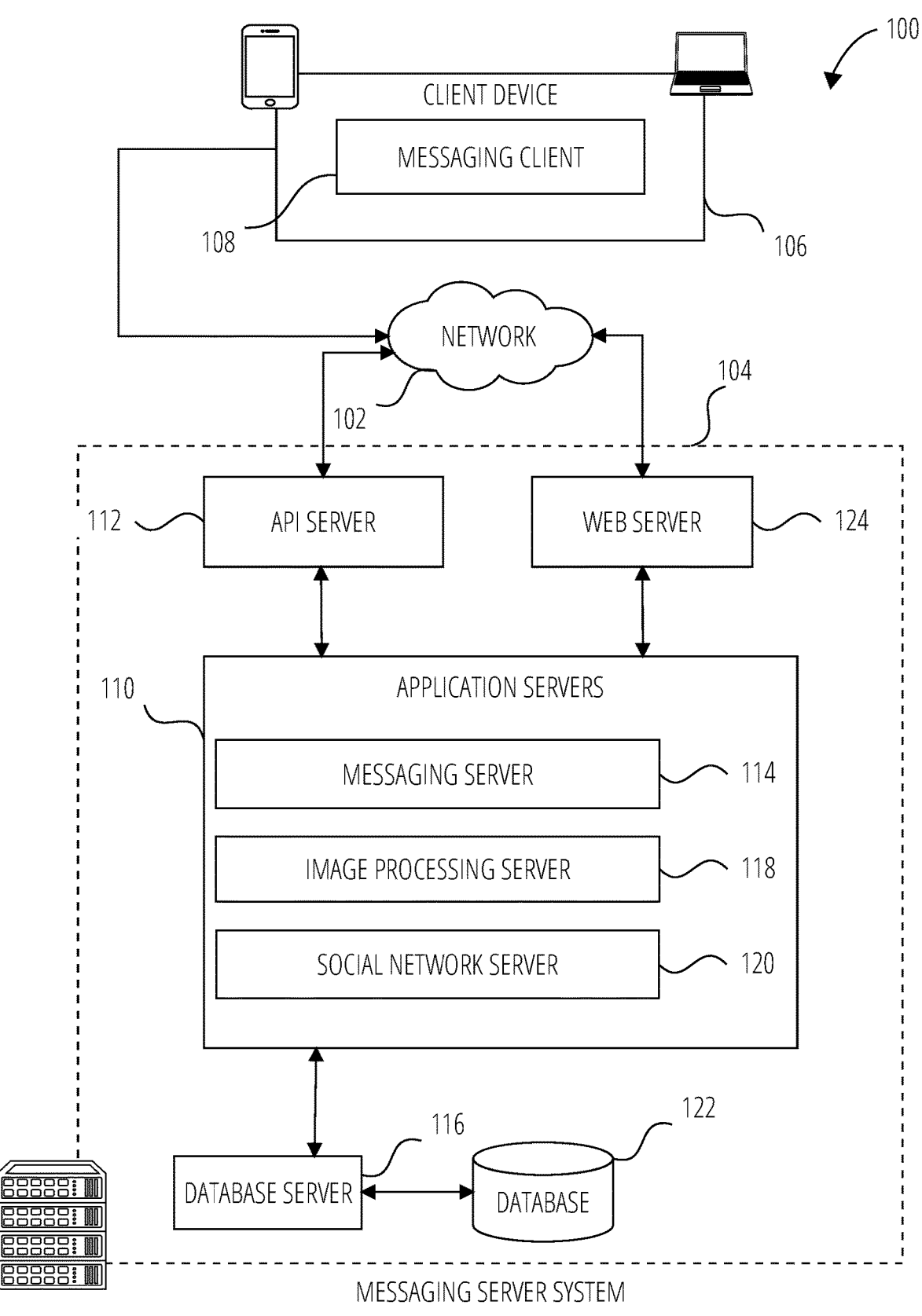
FIG. 1 is a diagrammatic representation of a networked environment in which the present disclosure may be deployed, in accordance with some examples.

As discussed above, conventional systems for generating 3D images and measuring the depth of an object may require the use of a stereoscopic camera, or using lidar sensors. Not all devices may include the required sensors or stereoscopic cameras. Moreover, these conventional systems may have a number of drawbacks, such as: the depth outputs calculated using conventional systems are often sparse; and conventional systems often require computationally complex operations to be implemented using devices with limited compute power. As a result, some conventional systems cannot be readily implemented on mobile devices with only a monocular camera. Accordingly, the disclosure below provides systems and methods for providing a dense and accurate depth estimate, and generating 3D images using a monocular camera associated with a client device, wherein the client device may have limited computational power.

According to certain example embodiments, a depth estimation system is configured to perform operations that include: receiving image data generated by a client device, the image data comprising monocular image data that depicts an environment based on a single image; identifying a set of image features based on the image data; determining a pose of the client device based on the set of image features, wherein the pose is based on an orientation and position of the client device, and wherein the pose has 6 degrees of freedom (i.e., 3 degrees for orientation and 3 degrees for position); generating a depth estimation based on the image data and the pose of the client device; and generating a mesh model of the environment based on the depth estimation.

In some embodiments, determining the pose of the client device may include performing operations that include: generating a point cloud based on the set of image features; and determining the orientation and position of the client device based on the point cloud. For example, in some embodiments, the system may perform Simultaneous Localization and Mapping (SLAM) based on the image data. SLAM refers to the computational process of constructing or updating a map of an unknown environment while simultaneously keeping track of a client device's location within it. Accordingly, a byproduct of performing SLAM may include a point cloud, wherein the point cloud provides a sparse depth estimate.

In some embodiments, generating the depth estimation based on the image data may be based on a machine-learned (ML) model, wherein the ML model is trained to output a depth estimation based on a public dataset. For example, the public dataset may be compiled based on monocular image data received from a plurality of client devices, and hosted within a database accessible by the depth estimation system. Accordingly, the ML model may be trained based on the public dataset, to receive monocular image data as an input, wherein the monocular image data comprises an image that comprises RGB data (i.e., red, green, blue data), and to output a depth estimation, a set of semantic labels, and a surface normal. In some embodiments, the depth estimation may be further refined/corrected using the point cloud generated as a byproduct of determining the pose of the client device.

In some embodiments, the depth estimation system may generate a mesh model of the environment depicted by the monocular image data, wherein the mesh model is based on the outputs of the ML model and the orientation and translation of the client device. In some embodiments, the mesh model may include the set of semantic labels output by the ML model. Accordingly, the depth estimation system may cause display of a presentation of the mesh model upon the image data at the client device, in real-time, as the client device generates image data.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
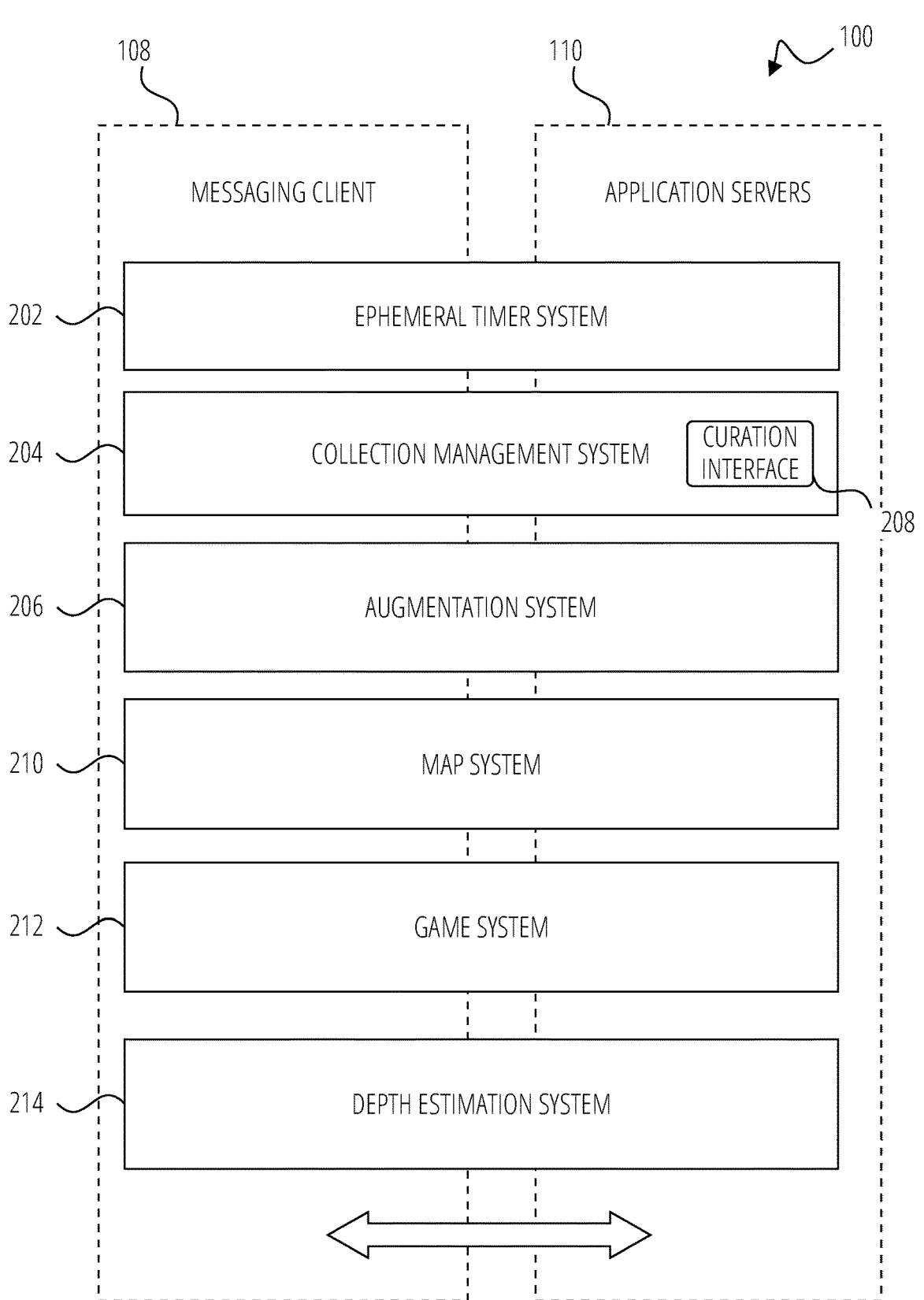
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a depth estimation system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The depth estimation system 214 provides functions related to estimating depth based on one or more inputs, and generating and displaying a 3D image, according to certain example embodiments.

FIG. 3 is a flowchart illustrating operations of a depth estimation system 214 in performing a method 300 for providing a depth estimate and generating a 3D image based on monocular image data, in accordance with one embodiment. Operations of the method 300 may be performed by one or more subsystems of the messaging system 100 described above with respect to FIG. 2, such as the depth estimation system 214. As shown in FIG. 3, the method 300 includes one or more operations 302, 304, 306, 308, and 310.

At operation 302, the depth estimation system 214 receives image data generated by a client device 106, wherein the image data comprises monocular image data that includes a single RGB image that depicts a set of image features. For example, a user of the client device 106 may provide one or more inputs to the client device 106 in order to activate a camera associated with the client device 106, and in response the camera associated with the client device 106 may generate the monocular image data, wherein the monocular image data comprises a single RGB image.

At operation 304, the depth estimation system 214 identifies the set of image features based on the monocular image data. For example, the set of image features may include detected edges or corners within the image data. Accordingly, the system may generate a point cloud based on the image data, wherein the point cloud provides sparse depth estimates.

At operation 306, the depth estimation system 214 determines a pose of the client device 106, wherein the pose defines a position and orientation of the client device 106. For example, in some embodiments, the system may perform SLAM based on the image data in order to determine the pose of the client device 106, wherein the pose defines a position and orientation of the client device 106.

At operation 308, the depth estimation system 214 generates a depth estimation based on the monocular image data and the pose of the client device 106. In some embodiments, the depth estimation may be generated using an ML model trained to receive inputs that include the image data and the pose of the client device 106, and outputs a depth estimation, surface normals, and a set of semantic labels. At operation 310, generates and causes display of a presentation of a mesh model that represents the environment based on the depth estimation at the client device 106.

FIG. 4 is a flowchart illustrating operations of a depth estimation system 214 in performing a method 400 for providing a depth estimate, in accordance with one embodiment. Operations of the method 400 may be performed by one or more subsystems of the messaging system 100 described above with respect to FIG. 2, such as the depth estimation system 214. As shown in FIG. 4, the method 400 includes one or more operations 402, 404, 406, and 408. In some embodiments, the method 400 may be performed as a subroutine of operation 308 of the method 300.

At operation 402, the depth estimation system 214 accesses an ML model, wherein the ML model is trained to generate an output that includes a relative depth estimation, based on an input that includes monocular image data, and a point cloud, wherein the monocular image data comprises a single RGB image, and the point cloud may be generated as a byproduct of determining a pose of the client device 106, as in operations 304 and 306 of the method 300.

At operation 404, the depth estimation system 214 applies the ML model to the image data collected by the client device 106, wherein the image data includes monocular image data generated by a camera of the client device 106. At operation 406, the depth estimation system 214 receives an output of the ML model, wherein the output includes a relative depth estimation.

At operation 408, the depth estimation system 214 generates a depth estimation based on the point cloud generated based on the image data, wherein the point cloud comprises a sparse depth estimate. The depth estimation system 214 may thereby generate and display a mesh model based on the depth estimation.

Figure 5:
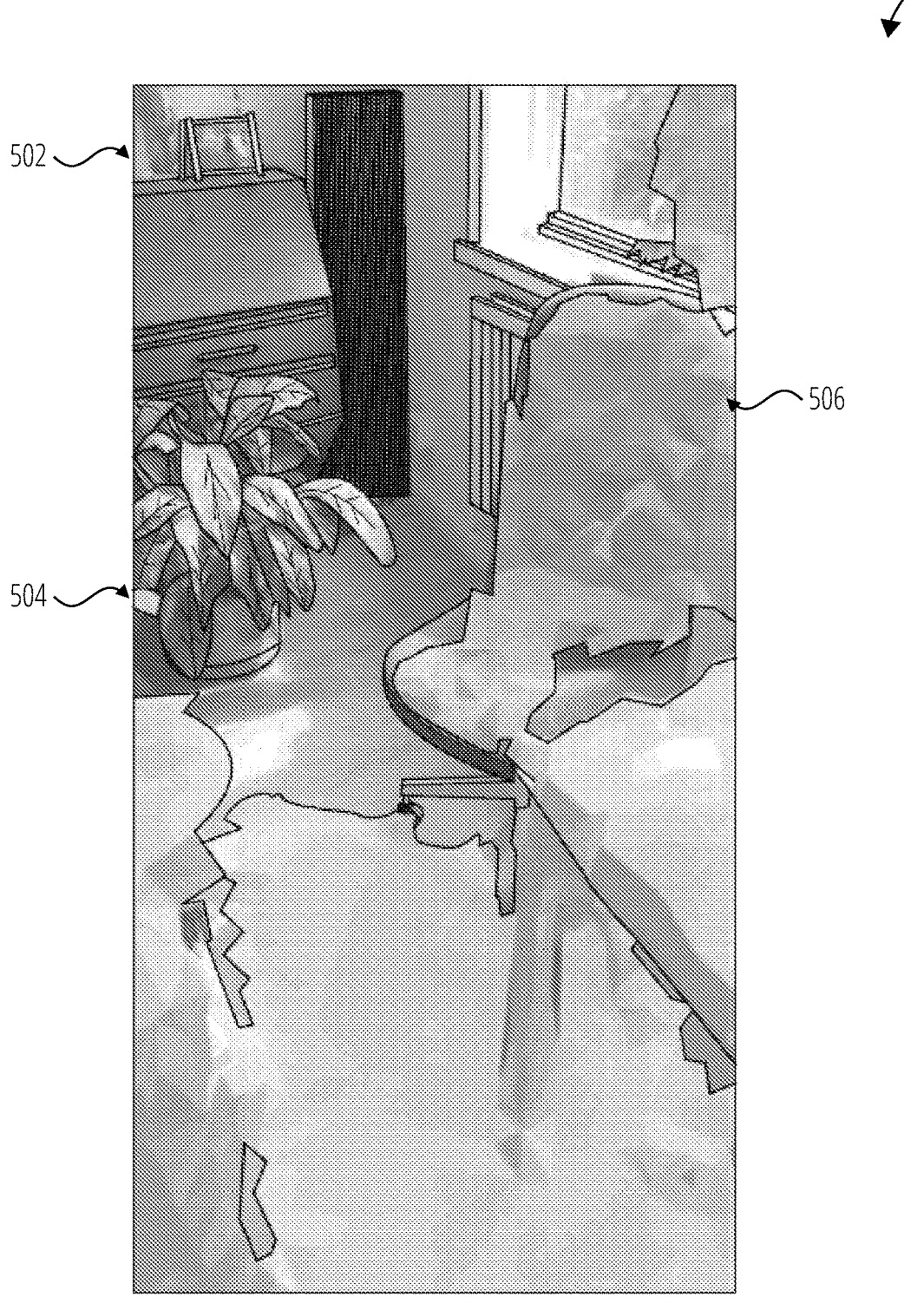
FIG. 5 is an interface diagram depicting a depth estimation, in accordance with one embodiment.

FIG. 5 is an interface diagram 500 depicting a mesh model generated and displayed based on a depth estimation 506, in accordance with one embodiment. For example, the mesh model 506 may be displayed in real-time upon image data 504 within a GUI 502 of a client device 106.

Machine Architecture

Figure 6:
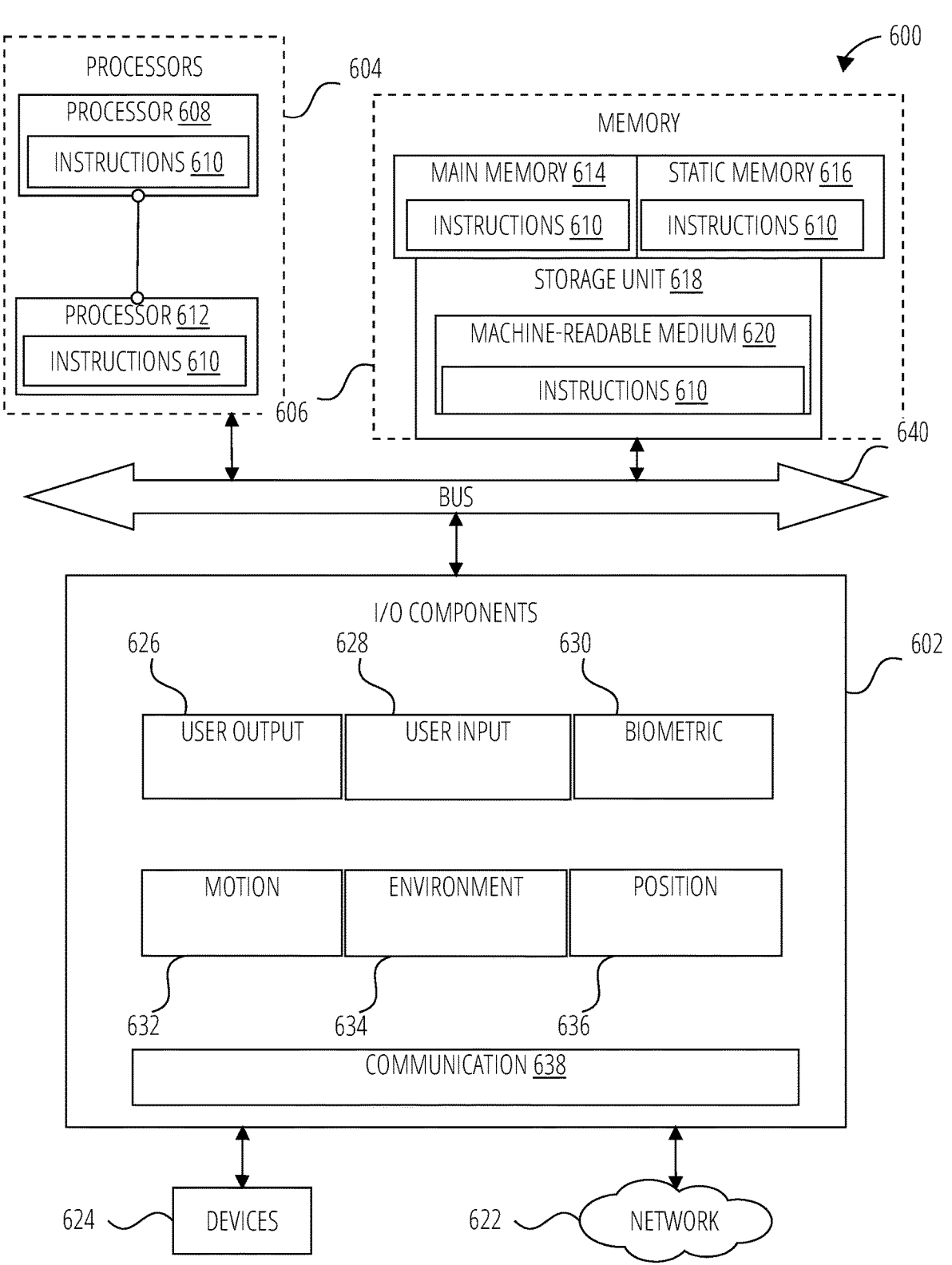
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the client device 106 or any one of a number of server devices forming part of the messaging server system 104. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 638, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Software Architecture

Figure 7:
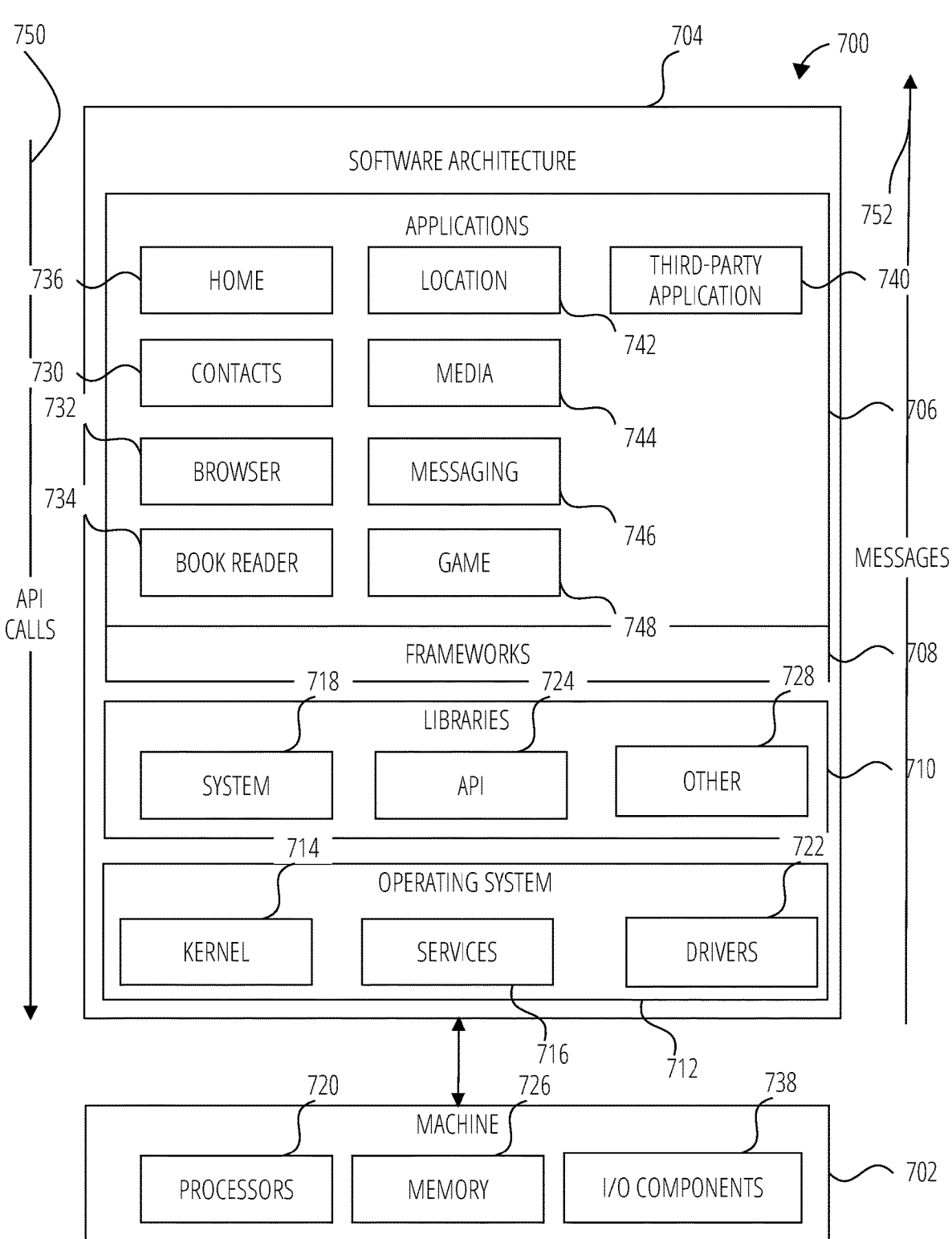
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLU-ETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Processing Components

Figure 8:
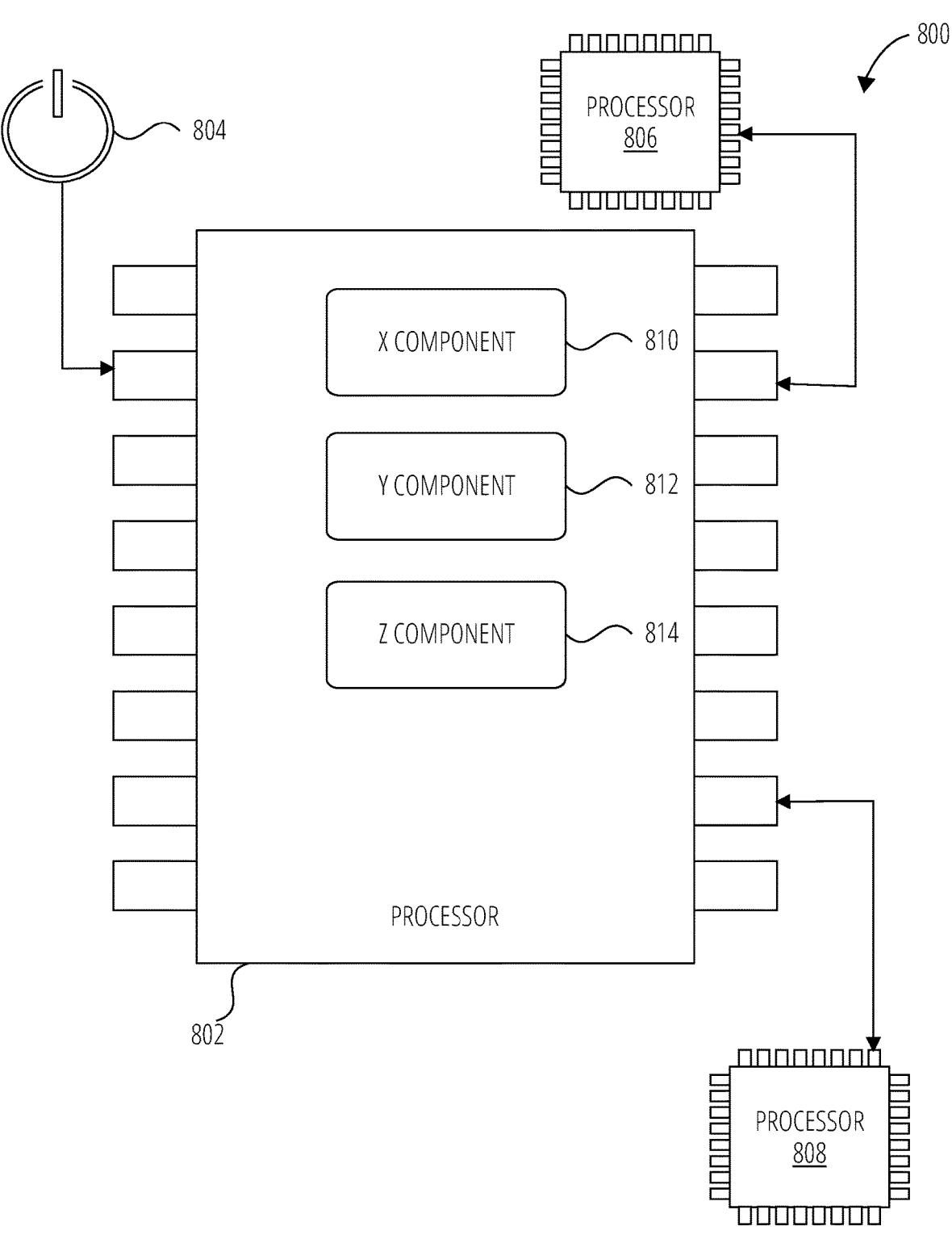
FIG. 8 is a diagrammatic representation of a processing environment, in accordance with some examples.

Turning now to FIG. 8, there is shown a diagrammatic representation of a processing environment 800, which includes a processor 802, a processor 806, and a processor 808 (e.g., a GPU, CPU or combination thereof).

The processor 802 is shown to be coupled to a power source 804, and to include (either permanently configured or temporarily instantiated) modules, namely an X component 810, a Y component 812, and a Z component 814, operationally configured to provide a depth estimation and generate a 3D image, in accordance with embodiments discussed herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
receiving an image that comprises image data generated by a client device from a single capture, the image data comprising a depiction of an environment;
identifying a set of image features within the image based on the image data;
determining a pose of the client device based on the set of features from within the image;
providing the image data and the pose of the client device to a machine-learned (ML) model;
receiving, from the ML model, a depth estimation based on the image data and the pose of the client device; and
generating a mesh model of the environment based on the depth estimation.

2. The method of claim 1, wherein the determining the pose of the client device includes:
generating a point cloud based on the set of image features; and
determining a position and orientation of the client device based on the point cloud.

3. The method of claim 2, wherein the generating the mesh model based on the depth estimation further comprises:
correcting the depth estimation based on the pose of the client device, and the point cloud.

4. The method of claim 1, wherein the image data includes monocular image data generated by the client device.

5. The method of claim 1, wherein the generating the depth estimation is based on an output of an ML model, wherein the ML model is trained to generate the output based on a public dataset.

6. The method of claim 5, wherein the output of the ML model includes:
the depth estimation;
a set of semantic labels; and
a surface normal.

7. The method of claim 5, wherein the generating the mesh model of the environment is based on the output of the ML model, and the pose of the client device.

8. A system comprising:
a memory; and
at least one hardware processor coupled to the memory and comprising instructions that causes the system to perform operations comprising:
receiving an image that comprises image data generated by a client device from a single capture, the image data comprising a depiction of an environment;
identifying a set of image features within the image based on the image data;
determining a pose of the client device based on the set of features from within the image;
providing the image data and the pose of the client device to a machine-learned (ML) model;
receiving, from the ML model, a depth estimation based on the image data and the pose of the client device; and
generating a mesh model of the environment based on the depth estimation.

9. The system of claim 8, wherein the determining the pose of the client device includes:
generating a point cloud based on the set of image features; and
determining a position and orientation of the client device based on the point cloud.

10. The system of claim 9, wherein the generating the mesh model based on the depth estimation further comprises:
correcting the depth estimation based on the pose of the client device, and the point cloud.

11. The system of claim 8, wherein the image data comprises monocular image data generated by the client device.

12. The system of claim 8, wherein the generating the depth estimation is based on an output of an ML model, wherein the ML model is trained to generate the output based on a public dataset.

13. The system of claim 12, wherein the output of the ML model includes:
the depth estimation;
a set of semantic labels; and
a surface normal.

14. The system of claim 8, wherein the generating the mesh model of the environment is based on the output of the ML model, and the pose of the client device.

15. A non-transitory machine-readable storage medium comprising instructions that, when executed by one or more processors of a machine, cause the machine to perform operations comprising:
receiving an image that comprises image data generated by a client device from a single capture, the image data comprising a depiction of an environment;
identifying a set of image features within the image based on the image data;
determining a pose of the client device based on the set of features from within the image;
providing the image data and the pose of the client device to a machine-learned (ML) model;
receiving, from the ML model, a depth estimation based on the image data and the pose of the client device; and
generating a mesh model of the environment based on the depth estimation.

16. The non-transitory machine-readable storage medium of claim 15, wherein the determining the orientation of the client device includes:

generating a point cloud based on the set of image features; and determining the orientation of the client device based on the point cloud and the IMU data.

17. The non-transitory machine-readable storage medium of claim 16, wherein the generating the mesh model based on the depth estimation further comprises:

correcting the depth estimation based on the pose of the client device, and the point cloud.

18. The non-transitory machine-readable storage medium of claim 17, wherein the generating the depth estimation is based on an output of an ML model, wherein the ML model is trained to generate the output based on a public dataset.

19. The non-transitory machine-readable storage medium of claim 18, wherein the output of the ML model includes:

the depth estimation;

a set of semantic labels; and a surface normal.

20. The non-transitory machine-readable storage medium of claim 15, wherein the image data comprises monocular image data generated by the client device.

\*  \*  \*  \*  \*